United States Patent
López et al.

(10) Patent No.: US 10,335,806 B2
(45) Date of Patent: Jul. 2, 2019

(54) FLUID EJECTION DEVICE

(71) Applicant: Fico Transpar, S.A., Barcelona (ES)

(72) Inventors: Miguel Mota López, Rubí (ES); Olallo Alcaide Hernández, El Prat de Llobregat (ES)

(73) Assignee: FICO TRANSPAR, S.A., Barcelona (ES)

( * ) Notice: Subject to any disclaimer, the term of this patent is extended or adjusted under 35 U.S.C. 154(b) by 4 days.

(21) Appl. No.: 15/657,695

(22) Filed: Jul. 24, 2017

(65) Prior Publication Data

US 2018/0021792 A1    Jan. 25, 2018

(30) Foreign Application Priority Data

Jul. 22, 2016    (EP) .................... 16382358

(51) Int. Cl.
  *G05B 1/00*    (2006.01)
  *B05B 1/16*    (2006.01)
  (Continued)

(52) U.S. Cl.
  CPC ............. *B05B 1/1672* (2013.01); *B05B 1/04* (2013.01); *B05B 1/205* (2013.01); *B08B 3/02* (2013.01);
  (Continued)

(58) Field of Classification Search
  CPC .......... B05B 1/04; B05B 1/08; B05B 1/1672; B05B 1/205; B60S 1/52; B60S 1/528
  (Continued)

(56) References Cited

U.S. PATENT DOCUMENTS 1,815,880 A * 7/1931 Buckner .................. B05B 3/06
                                                            239/240
3,263,929 A * 8/1966 Seablom ................. B05B 15/74
                                                            239/204
(Continued)

FOREIGN PATENT DOCUMENTS

EP    0572147 A1    12/1993
EP    1506109 A1    2/2005
(Continued)

OTHER PUBLICATIONS

European Search Report from the European Patent Office for EP Application No. 16382358.6, dated Feb. 22, 2017; 4 pages.

*Primary Examiner* — Viet Le
(74) *Attorney, Agent, or Firm* — Cantor Colburn LLP

(57) ABSTRACT

The fluid-ejection device (100) comprised a first member (110) having an inlet suitable for being connected to a source of fluid (120); a second member (130) that can be moved relative to the first member (110); and a control member (150) arranged to be at least in a first condition, in which the control member (150) is at least substantially inside the second member (130) preventing the flow of fluid through the second member (130) to define a first stroke (S1) of the second member (130) where no discharge of fluid is allowed out of the device (100); and a second condition, in which the control member (150) is at least substantially outside the second member (130) allowing the flow of fluid through the second member (130) to define a second stroke (S2) of the second member (130) along which discharge of fluid is allowed out of the device (100).

10 Claims, 3 Drawing Sheets

(51) Int. Cl.
*B05B 1/04* (2006.01)
*B05B 1/20* (2006.01)
*B08B 3/02* (2006.01)
*B60S 1/52* (2006.01)
*B60S 1/56* (2006.01)

(52) U.S. Cl.
CPC ............... *B60S 1/52* (2013.01); *B60S 1/528* (2013.01); *B60S 1/56* (2013.01)

(58) Field of Classification Search
USPC .............. 239/284.1, 284.2, 203, 204, 205
See application file for complete search history.

(56) References Cited

U.S. PATENT DOCUMENTS

| | | | | |
|---|---|---|---|---|
| 3,331,292 | A * | 7/1967 | Seablom | F15B 15/1466 92/108 |
| 4,254,913 | A * | 3/1981 | Georgiev | B05B 15/70 239/204 |
| 4,939,797 | A * | 7/1990 | Goettl | E04H 4/169 4/490 |
| 5,242,114 | A * | 9/1993 | Camier | B60S 1/528 239/284.2 |
| 5,605,286 | A * | 2/1997 | Orth | B60S 1/528 239/284.2 |
| 5,762,271 | A * | 6/1998 | Lind | B05B 1/304 239/284.2 |
| 5,803,365 | A * | 9/1998 | Ruttenberg | B05B 15/70 239/204 |
| 5,921,322 | A * | 7/1999 | Bonfield | A62C 37/09 169/37 |
| 6,000,632 | A * | 12/1999 | Wallace | B05B 15/00 239/204 |
| 6,296,198 | B1 * | 10/2001 | Tores | B60S 1/481 239/284.1 |
| 6,481,644 | B1 * | 11/2002 | Olsen | A62C 31/03 169/37 |
| 6,752,329 | B1 * | 6/2004 | Price | B60S 1/528 239/284.2 |
| 6,905,078 | B1 * | 6/2005 | Gattuso | B05B 3/0413 239/11 |
| 6,951,223 | B2 * | 10/2005 | Fukushima | B60S 1/481 134/186 |
| 7,318,556 | B2 * | 1/2008 | Lee | B05B 15/70 239/572 |
| 8,905,328 | B2 * | 12/2014 | Hartnell | B60S 1/603 239/203 |
| 8,967,495 | B2 * | 3/2015 | Hamza | B05B 11/3001 239/284.2 |
| 2003/0047621 | A1 * | 3/2003 | Fukushima | B60S 1/481 239/284.1 |
| 2003/0116645 | A1 * | 6/2003 | Hirose | B60S 1/528 239/284.2 |
| 2004/0074988 | A1 * | 4/2004 | Sternbach | B05B 1/046 239/284.1 |
| 2004/0188541 | A1 * | 9/2004 | Maruyama | B60S 1/481 239/284.1 |
| 2005/0178852 | A1 * | 8/2005 | Yon | B60S 1/52 239/284.1 |
| 2005/0236496 | A1 * | 10/2005 | Lasebnick | B05B 1/3006 239/284.1 |
| 2006/0289678 | A1 * | 12/2006 | Sakai | B60S 1/528 239/284.2 |
| 2008/0142619 | A1 * | 6/2008 | Kim | B05B 1/08 239/284.1 |
| 2008/0210780 | A1 * | 9/2008 | Discher | B60S 1/528 239/284.2 |
| 2009/0014555 | A1 * | 1/2009 | Litvinov | B05B 1/3436 239/284.2 |
| 2011/0215173 | A1 * | 9/2011 | Hartnell | B60S 1/528 239/284.2 |
| 2015/0375717 | A1 * | 12/2015 | Kracker | B60S 1/528 134/18 |
| 2016/0144831 | A1 * | 5/2016 | Caillot | B60S 1/481 239/1 |

FOREIGN PATENT DOCUMENTS

| | | |
|---|---|---|
| EP | 1694541 | 6/2005 |
| FR | 2796866 A1 | 2/2001 |
| FR | 3021014 A1 | 5/2014 |

* cited by examiner

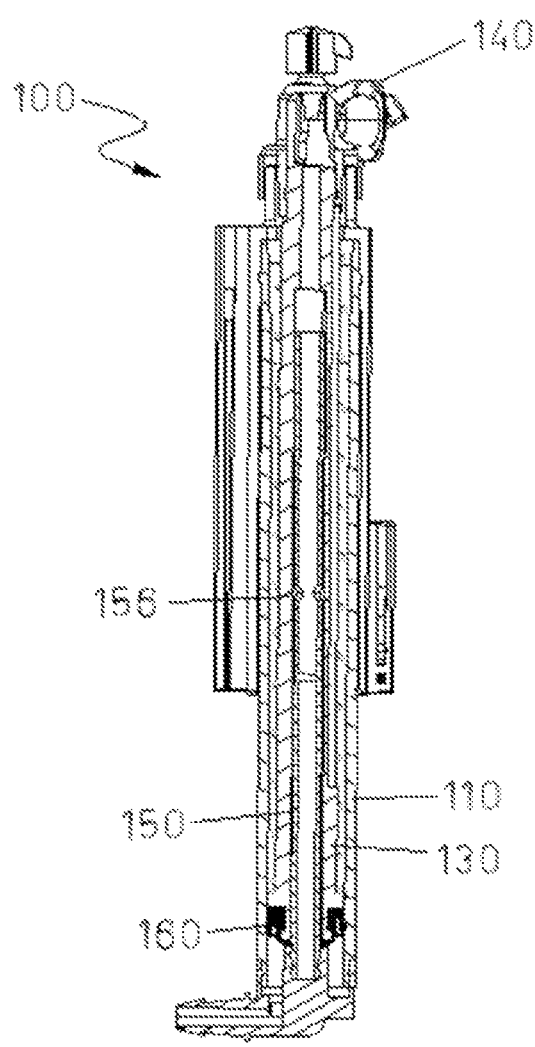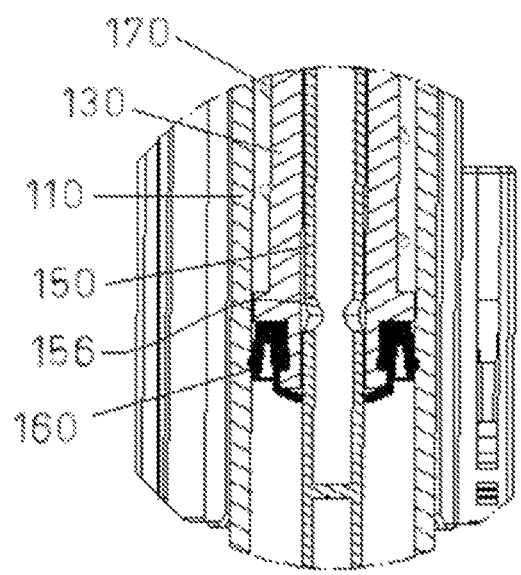

FLUID EJECTION DEVICE

CROSS-REFERENCE TO RELATED APPLICATION

This application claims priority to European patent application no. EP16382358.6, filed on Jul. 22, 2016, the disclosure of which is incorporated herein by reference in its entirety.

BACKGROUND

The present disclosure relates to fluid-ejection devices intended for washing for example surfaces of parts in motor vehicles and for many other applications.

Fluid-ejection devices are known in the art for washing surfaces of parts in motor vehicles such as for example motor vehicle headlights, lenses, sensors, etc. The main problem found in said devices known so far is that certain areas or parts can not be fully reached. As a consequence, they are not washed, or they cannot be washed properly, e.g. incompletely washed.

A number of alternative solutions have been proposed in the art for addressing the above problems. Examples of said alternative solutions are orientable nozzles and telescopic assemblies.

Prior art orientable nozzles have been shown to be ineffective due for example to the presence of external parts or accessories that may be provided in the path of the liquid being ejected. Again, certain areas or parts cannot be reached and therefore they cannot be washed adequately, while other areas cannot be completely washed.

Known telescopic devices comprise a hollow cylinder, a hollow piston and a nozzle connected to the hollow piston. The hollow piston is driven to be displaced relative to the hollow cylinder as a cleaning liquid is injected therein. Once the hollow piston with the nozzle has been extended, the cleaning liquid is ejected through the nozzle out onto the surface to be washed. While such known telescopic devices have been shown to at least partially overcome the above problems, they are still complex and in some cases they are not able to perform an efficient washing as required.

Examples of telescopic devices for washing surfaces in motor vehicles are disclosed in EP1694541 and EP1506109. The washing device disclosed in EP1694541 comprises a hollow cylinder, a hollow piston and a nozzle connected thereto. The hollow piston is arranged to slide inside the hollow cylinder against a spring as it is driven by a liquid that is fed therewithin. The liquid is then ejected only when the piston has reached a predetermined extended position. The washing device disclosed in EP1506109 comprises an inner hollow cylinder, an outer hollow cylinder fitting into each other and a telescopic nozzle. The inner hollow cylinder comprises an opening for conducting liquid that remains closed as it abuts the outer hollow cylinder. Cleaning liquid is supplied when the telescopic nozzle is completely telescoped.

Another telescopic washing device for projecting a cleaning liquid to a surface of a motor vehicle is disclosed in FR3021014. The telescopic washing device in this case also comprises a fixed member, a movable member and a seal. The movable member is initially retracted and then liquid enters through an inlet port of the fixed member to fill a chamber formed therein. This causes the movable member to be displaced against a spring with an elastically deformable portion of the seal leaning against a first section of the control member such that liquid is still inside chamber under pressure and it is not allowed to flow outside. When the movable member reaches a position where the elastically deformable portion of the seal leans against a second section of the control member having passages, the liquid is allowed to flow through said passages into the control member allowing the liquid to be ejected outside.

The above prior art telescopic washing devices have a number of disadvantages. For example, the washing devices described in EP1694541 and EP1506109 require the stroke of the nozzle to be accurately designed for each specific condition, i.e. a specific type and/or location of the surface to be washed, a specific position and size of the nozzle, the pressure of the liquid that is injected, etc. As a result, such washing devices involve expensive designs and in some cases may be inefficient. In the telescopic washing device disclosed in FR3021014 the control member should be designed according to the stroke to be traveled by the movable member which in some cases may be long resulting again in undesirably complex and capital intensive devices.

There is thus a need for efficient fluid-ejection devices to be used for washing surfaces of parts in motor vehicles and other applications which is in turn simple in structure as well as cost effective in design and manufacturing.

BRIEF DESCRIPTION OF THE INVENTION

A fluid-ejection device is provided herein with which the above need is fulfilled while additional advantages are obtained. The present fluid-ejection device is adapted to eject a fluid such as a washing liquid, a washing gas, a combination of washing liquids, a combination of washing gases, a combination of washing liquid (or liquids) and gas (or gases) etc. against a surface to be washed, flushed, rinsed, etc.

The present fluid-ejection device comprises first and second members and a source of said pressurized fluid. The first member is adapted to be connected to the source of pressurized fluid and the second member is arranged such that it can be moved relative to the first member when it is driven by the fluid that is supplied by the above mentioned source of pressurized fluid.

A control member is also provided. The control member may be a part of the first member, e.g. formed integral with, or it may be attached thereto. The control member may be arranged to be at least in a first condition and in a second condition depending on the position of the second member. In the first condition, the control member is at least substantially inside the second member preventing the flow of fluid through the second member defining a first stroke of the second member along or during which no discharge of fluid is allowed out of the fluid-ejection device. In the second condition, the control member is at least substantially outside the second member allowing the flow of fluid through the second member defining a second stroke of the second member along or during which discharge of fluid is allowed out of the fluid-ejection device.

An advantageous feature of the present fluid-ejection device is the provision of different strokes for the second member. The discharge of fluid out of the fluid-ejection device is thus suitably controlled such that a broad range of different surfaces of parts in motor vehicles regardless of their shape such as camera lenses, sensors, vision and detection elements, and other parts installed in vehicles as well as in many other applications can be washed efficiently. For example, by providing for an initial displacement of the second member, i.e. the above mentioned first stroke, during which no fluid is ejected outside the fluid-ejection device, areas which must be prevented from getting wet are advantageously avoided such that they are not damaged.

The control member may be adapted to be at least partially inserted inside the second member. This may be carried out by varying the height of the control member as required, that is, such that the height of the control member substantially corresponds to said initial displacement, i.e. the first stroke, of the second member during which no fluid is ejected outside the device.

A further advantage of the present fluid-ejection device is derived from the above mentioned feature that the control member may be adapted to be at least partially inserted inside the second member. This allows the section for the passage of fluid to be precisely varied. In some cases, the control member may be adapted to be arranged out of inside the second member, that is, not inserted therein. As a result, a longer fluid-ejection device can be made without having to design a larger control member. Consequently, important material savings can be advantageously achieved.

In some examples, the control member may comprise a post or similar element. The post may be hollow and provided with holes, i.e. through holes, through which fluid is allowed to be discharged into the second member. Said holes may be formed at side portions of the post at different heights. Other different hole formations and arrangements are possible.

In general, it may be preferred that a section for the passage of fluid through the first member increases along the direction of movement of the second member to discharge fluid out of the device. For example, the inside diameter of the first member could increase along the direction of movement of the second member. Other configurations are not ruled out.

A nozzle is also provided to suitably discharge fluid out of the device. The nozzle may be formed integral with the second member or it may be a separate part attached to the second member. The nozzle may be configured to discharge a fan stream of fluid out of the device. This allows an increased area in surfaces of parts in motor vehicles, such as motor vehicle headlights, sensors, etc. to be efficiently washed. The nozzle may be configured to discharge a fan stream of fluid covering an angle of about 15-45°. The fan angle of the stream of fluid that is ejected or discharged from the device may be of course varied depending on the application to which the device is directed and the position of the nozzle. In other cases, the nozzle may be adapted to eject or discharge fluid according to a solid stream for promoting stability such as against wind when the vehicle is running, etc. The nozzle may be configured to provide different ejection modes.

Sealing means are preferably provided between the first member and the second member. The sealing means may comprise an O-ring. It may be attached to the second member, for example. The sealing means may act as a one-way valve means, such as a check valve, associated with the second member. This prevents the fluid supplied from returning back into the source of pressurized fluid when the fluid-ejection device is not actuated. With the above configuration, the exact position of fluid ejection can be precisely controlled. Thus, the second telescopic member is driven by the pressurized washing fluid as it pushes the sealing means when supplied into the first telescopic member.

It is preferred that the present device further includes spring means, such as a compression spring, arranged to oppose the movement of the second member relative to the first member.

The present fluid-ejection device has been found to provide a very efficient, highly uniform stream of fluid capable of reaching a wide range of areas without relying on spring valve means as in known devices. The present fluid-ejection device has been found to be very advantageous since the fluid outlet position can be easily varied by modifying the nozzle position as required due to the design of the control member to define second member strokes along or during which fluid is, or it is not, allowed to be discharged from the device.

A sweeping effect may be provided as required. This may be carried out by ejecting a stream of fluid as the second member is driven, that is, along or during the second stroke of the second member. As a result, an efficient washing effect is accomplished causing dirt to be efficiently removed.

Additional objects, advantages and features of examples of the present fluid-ejection device will become apparent to those skilled in the art upon examination of the description, or may be learned by practice thereof.

BRIEF DESCRIPTION OF THE DRAWINGS

Particular implementations of the present fluid-ejection device will be described in the following by way of non-limiting examples, with reference to the appended drawings, in which:

FIG. 5 is a general elevational view of a further example of the present fluid-ejection device;

FIG. 6 is a sectional view showing the example of the fluid-ejection device illustrated in FIG. 5.

DETAILED DESCRIPTION OF THE INVENTION

Figure 1:
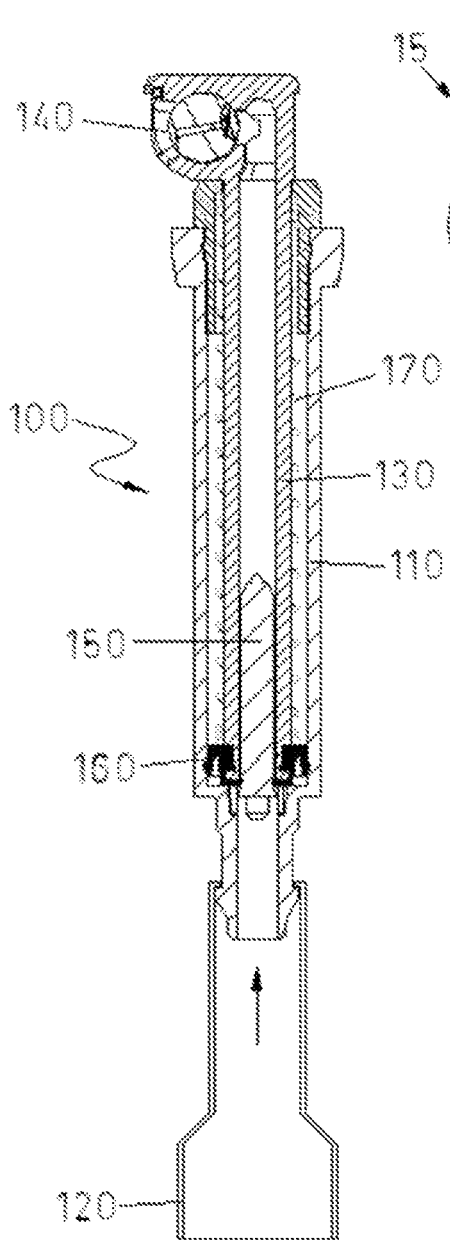
FIG. 1 is a sectional view where one example of the present fluid-ejection device has been shown in a rest position.

The device 100 that is described hereinbelow according to the example shown in the figures can be applied in the field of motor vehicles. However, it may be useful in many other different applications where at least a surface 10 has to be washed. In the particular examples, the present fluid-ejection device 100 illustrated in the FIGS. 1-5 of the drawings is adapted to eject a washing liquid against a surface 10 in a motor vehicle part 15 such as a camera lens, a sensor, vision and detection elements, and other parts installed in the vehicle, etc.

The fluid-ejection device 100 shown in the drawings comprises first and second telescopic members 110, 130, a source of pressurized fluid 120, a nozzle 140, a control member 150, sealing means 160, and spring means 170.

The first telescopic member 110 is a fixed member that is connected to the source of pressurized fluid 120 that supplies a pressurized washing liquid in the present non-limiting example shown. Here, the pressure of the washing liquid to be supplied may be, for example, of the order of 1-3 Kg/cm$^2$.

The second telescopic member 130 is a displaceable member that is arranged inside the first telescopic member 110 and can be moved relative thereto when the washing liquid is fed within the first telescopic member 110. Thus, the second telescopic member 130 is driven by the pressurized washing liquid as it pushes the sealing means 160 when supplied into the first telescopic member 110.

The control member in the example shown comprises a post 150 that is part of the first telescopic member 110. However, the post 150 could be a separate part attached to the first telescopic member 110 if necessary. In the example shown, the post 150 is a cylinder having a top pointed tip 155. This specific shape of the post 150 facilitates positioning of the second telescopic member 130 surrounding the post 150, above all, when the second telescopic member 130 returns to its rest position.

In the particular example shown in FIG. 5, the post 150 comprises a hollow cylinder having a number of through holes 156 as show in detail in FIG. 6 of the drawings. The washing liquid is allowed to be discharged through said through holes 156 into the second telescopic member 130. The through holes 156 are formed at a side portion of the hollow cylinder.

When a washing operation is to be performed, a washing fluid enters through the first member 110. From the rest position shown in FIG. 1, the washing fluid cause the second member 130 to move upwards in the drawings. The second member 130 thus moves relative to the post 150 such that the second member 130 can be arranged in a first, rest condition shown in FIG. 1 and in a second, operating condition shown in FIG. 2.

In the first, rest condition, shown in FIG. 1, the post 150 is positioned inside the second member 130 preventing the washing liquid from flowing through the second member 130. In this first condition, a first stroke S1 for the second member 130 is defined. Along or during the first stroke S1 of the second member 130 shown in FIG. 2 no washing liquid is allowed to be discharged out of the fluid-ejection device 100. In this way, an initial displacement corresponding to said first stroke S1 of the second member 130 can be established along or during which no washing liquid is ejected or discharged out of the fluid-ejection device 100. As a result, parts 15 or surfaces 10 which must be prevented from getting wet are avoided such that they are not damaged.

Figure 2:
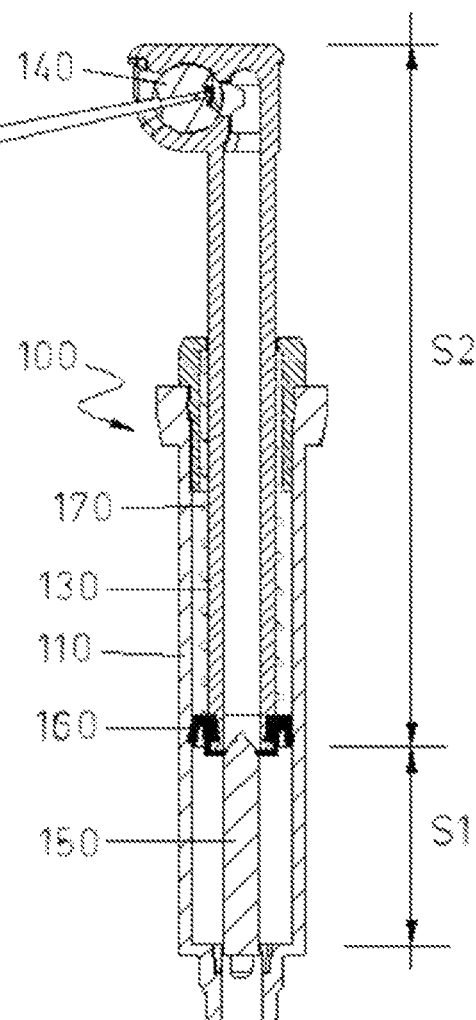
FIG. 2 is a sectional view where one example of the present fluid-ejection device has been shown in an operating position at the end of a first stroke.
Figure 3:
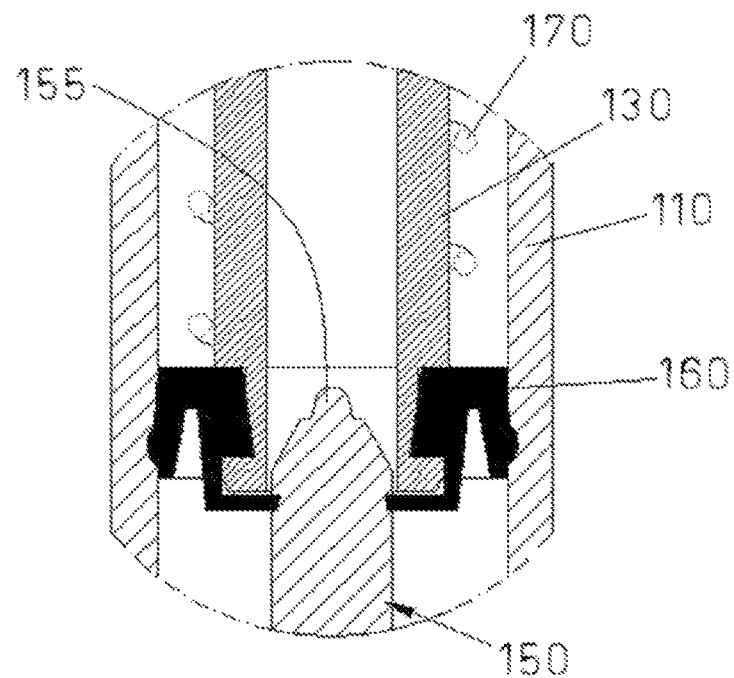
FIG. 3 is a sectional view of a position for the fluid-ejection device shown in FIG. 2.
Figure 4:
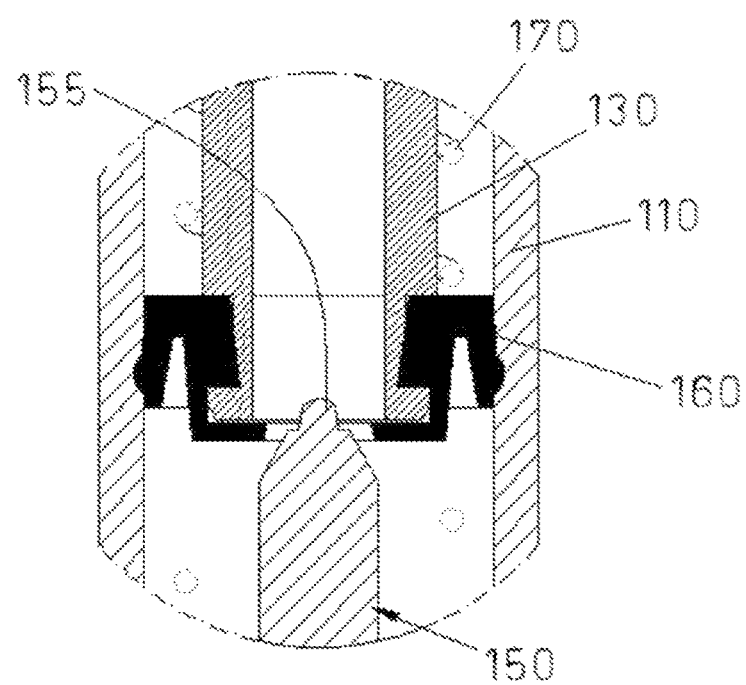
FIG. 4 is a sectional view of a position for the fluid-ejection device at the beginning of a second stroke.

In the second, operating condition, shown in FIG. 2, the second member 130 is moved until the post 150 is positioned outside the second member 130 allowing the washing liquid to flow through the second member 130. In such second condition, a second stroke S2 for the second member is defined as shown in FIG. 2. Along or during the second stroke S2 of the second member 130 the washing liquid is allowed to be discharged out of the fluid-ejection device 100. The discharge of washing liquid as the second member 130 moves relative to the first member 110 along or during the second stroke S2 allows a sweeping effect to be provided with the washing fluid stream uniformly distributed against the surface 10 of the part 15 being washed. An efficient washing effect is thus accomplished causing dirt to be efficiently removed from the surface 10 of the part 15.

The passage of washing liquid can be thus precisely varied by varying the height of the post 150 as required. For example, the height of the post 150 can be made to substantially correspond to the above mentioned initial displacement of the second member 130, that is, the first stroke S1 of the second member 130, during which no washing liquid is allowed to be ejected outside the device 100. A number of interchangeable posts 150 may be thuds provided having different heights. Consequently, the device 100 can be designed to adapt to a large number of applications and to a great number of different parts regardless of their shape by simply varying such parameter as required. A wide range of applications can be thus covered with a single fluid-ejection device 100.

In general, it may be preferred that a section for the passage of washing liquid through the first member 110 increases along the direction of movement of the second member 130 to discharge washing liquid out of the device 100. For example, if the first and second members 110, 130 are cylindrical in shape as shown in the examples, the inside diameter of the first member 110 could increase along the direction of movement of the second member 130. Other configurations are also possible as required according to the specific application of the device 100.

The nozzle 140 is attached to the second member 130 and it is adapted to discharge the washing liquid out of the device 100 during the second stroke S2 of the second member 130. The nozzle 140 in the device 100 of the example is capable of providing a fan stream of washing liquid covering an angle of about 15-45°.

The sealing means in the example shown comprises an O-ring 160 arranged between the first member 110 and the second member 130. The O-ring 160 is attached to the second member 130 and it is also configured to act as an one-way valve means to allow the washing liquid that is supplied by the source of pressurized washing liquid 120 to enter therein, and such that when the fluid-ejection device 100 is not actuated, the washing liquid is not allowed to return back to the source of pressurized washing liquid 120.

The spring means in the example shown comprise a compression spring 170 that is arranged to oppose the movement of the second member 130 relative to the first member 110. Thus, as the second member 130 is driven by the washing liquid supplied by the source of pressurized washing liquid 120, the spring 170 is compressed, and when no washing liquid is supplied, the spring 170 causes the second member 130 to be displaced back to a rest position, telescopically housed within the first member 110 in its inoperative state.

Although only a number of particular examples of the present fluid-ejection device have been disclosed herein, it will be understood by those skilled in the art that other alternative examples and/or uses and obvious modifications and equivalents thereof are possible. The present disclosure thus covers all possible combinations of the particular examples described of the fluid-ejection device. The scope of the present disclosure should not be limited by particular examples, but should be determined only by a fair reading of the claims that follow.

Reference signs related to drawings and placed in parentheses in a claim are solely for attempting to increase the intelligibility of the claim, and shall not be construed as limiting the scope of the claim.

What is claimed is:

1. A fluid-ejection device (100) comprising:
   a first member (110) having an inlet suitable for being connected to a source of fluid (120);
   a second member (130) that can be moved relative to the first member (110); and
   a control member (150) arranged to be at least in:
   a first condition, in which the control member (150) is at least substantially inside the second member (130) preventing the flow of fluid through the second member (130) to define a first stroke (S1) of the second member (130) where no discharge of fluid is allowed out of the device (100);
   a second condition, in which the control member (150) is at least substantially outside the second member (130) allowing the flow of fluid through the second member (130) to define a second stroke (S2) of the second member (130) along which discharge of fluid is allowed out of the device (100); and a seal between the first member and the second member and attached to the second member, wherein the seal includes a one-way valve that allows the fluid supplied by the source of fluid to enter therein, and wherein the second member is driven to move relative to the first member by pressurized fluid that pushes against the seal when supplied to the first member.

2. The device (100) of claim 1, wherein control member comprises a post (150).

3. The device (100) of claim 1, wherein control member comprises a hollow post (150) having holes (156) through which fluid is allowed to be discharged into the second member (130).

4. The device (100) of claim 3, wherein the holes (156) are formed at different heights in the post (150).

5. The device (100) of claim 1, wherein a section for the passage of fluid through the first member (110) increases between the first condition and the second condition.

6. The device (100) of claim 1, wherein the control member (150) is part of or is attached to the first member (110).

7. The device (100) of claim 1, wherein the second member (130) comprises at least one nozzle (140) to discharge fluid out of the device (100).

8. The device (100) of claim 7, wherein the nozzle (140) is configured to discharge a fan stream of fluid out of the device (100).

9. The device (100) of claim 8, wherein the nozzle (140) is configured to discharge a fan stream of fluid covering an angle of about 15-45°.

10. The device (100) of claim 1, wherein it further includes a spring (170) arranged to oppose the movement of the second member (130) relative to the first member (110).

* * * * *